US009826711B1

(12) United States Patent
Evans (10) Patent No.: US 9,826,711 B1
(45) Date of Patent: Nov. 28, 2017

(54) ALL PURPOSE PET CART (71) Applicant: Tracy Evans, New York, NY (US)

(72) Inventor: Tracy Evans, New York, NY (US)

( * ) Notice: Subject to any disclaimer, the term of this patent is extended or adjusted under 35 U.S.C. 154(b) by 194 days.

(21) Appl. No.: 14/695,531

(22) Filed: Apr. 24, 2015

(51) Int. Cl.
*A01K 1/02* (2006.01)
*B62B 1/12* (2006.01)
*B62B 1/16* (2006.01)
*B62B 5/06* (2006.01)

(52) U.S. Cl.
CPC ............ *A01K 1/0245* (2013.01); *B62B 1/125* (2013.01); *B62B 1/16* (2013.01); *B62B 5/065* (2013.01)

(58) Field of Classification Search
CPC .. A01K 1/0245; A01K 1/0035; A01K 1/0236; B62B 1/125; B62B 1/16; B62B 5/065; B62B 3/08; B60L 2260/34; A45C 5/14; A45C 13/26; A45C 13/262
See application file for complete search history.

(56) References Cited

U.S. PATENT DOCUMENTS

| | | | |
|---|---|---|---|
| 3,998,476 A * | 12/1976 | Kazmark, Sr. ......... | B62B 1/125 16/113.1 |
| 4,977,857 A | 12/1990 | Slawinski | |
| 5,113,793 A | 5/1992 | Leader et al. | |
| 398,083 A | 9/1998 | Martz | |
| 5,941,195 A * | 8/1999 | Martz .................. | A01K 1/0254 119/497 |
| 6,021,740 A | 2/2000 | Martz | |
| 6,230,656 B1 | 5/2001 | Walach | |
| 6,520,351 B1 * | 2/2003 | Zadro ..................... | A47K 3/281 211/106 |
| D505,754 S | 5/2005 | Cohen-Fyffe | |
| D662,263 S | 6/2012 | Chau et al. | |
| 8,267,048 B2 | 9/2012 | Flannery et al. | |
| 9,101,199 B1 * | 8/2015 | Harry ........................ | A45F 4/02 |
| 9,498,055 B2 * | 11/2016 | Lhoyer .................... | A47B 5/04 |
| 9,604,658 B2 * | 3/2017 | Kassab Arabo ........ | B62B 3/025 |
| 2001/0030403 A1 * | 10/2001 | Johnson ................. | A01K 13/00 280/47.26 |
| 2009/0205578 A1 | 8/2009 | Alves | |
| 2009/0302564 A1 | 12/2009 | Evans et al. | |
| 2016/0249721 A1 * | 9/2016 | Yazdi ....................... | A45C 3/12 |

OTHER PUBLICATIONS

Makeup Rolling Case, Amazon Advertisement, review date of Sep. 25, 2014.*
Kaytee Critter Trail Portable Petite Habitat, Amazon Advertisement, review date of at least Jul. 20, 2006.*
Cate with Caster Wheels, Amazon Advertisement, review date of at least Oct. 22, 2013.*

* cited by examiner

*Primary Examiner* — Monica Williams
*Assistant Examiner* — Jessica Wong
(74) *Attorney, Agent, or Firm* — Richard L Miller (57) ABSTRACT A rolling cart/carrier that self-rights a pet contained in the rolling cart/carrier regardless of what terrain is traversed, and is height-adjustable so as to allow comfortable rolling of the rolling cart/carrier by a user. The rolling cart/carrier includes a cart and a carrier. The cart is height-adjustable so as to allow comfortable rolling of the rolling cart/carrier by the user. The carrier is replaceably attached to the cart, and self-rights the pet contained in the carrier regardless of what terrain is traversed by the cart.

88 Claims, 12 Drawing Sheets

ALL PURPOSE PET CART

BACKGROUND OF THE INVENTION

Field of the Invention

The present invention relates to a pet cart, and more particularly, an all purpose pet cart.

Description of the Prior Art

Numerous innovations for pet carriers have been provided in the prior art that will be described. Even though these innovations may be suitable for the specific individual purposes to which they address, however, they differ from the present invention.

A FIRST EXAMPLE, U.S. Pat. No. 4,977,857, Issued on Dec. 18, 1990, to Slawinski teaches a pet carrier for enabling pets to accompany their owners on long walks and hikes, which includes a flexible and bag-like body with a slit defined along the upper surface of the bag, a forward cut-out portion extending rearwardly from a cut-out portion. A small animal may be enclosed within the bag-like body with the animal's head disposed adjacent the cut-out portion when the slit is closed. A meshed snout portion is releasably mounted to the cut-out portion for retaining the pet within the carrier. Further, wheels or a wheeled base can be mounted to the bottom surface of the carrier so that the carrier can be pulled on the wheels rather than carried with the carrying straps. A rain hood-type shield is coupled to the bag-like body so as to extend forwardly over the cut-out portion.

A SECOND EXAMPLE, U.S. Pat. No. 5,113,793, Issued on May 19, 1992, to Leader, et al. teaches a mobile animal carrier having a cage-like enclosure mounted on a specially-designed carriage with wheels for holding and transporting the enclosure. The carriage has a handle to make pushing easy for the pet owner. The enclosure contains an access, preferably, including at least one door in a front end of the enclosure for inputting and removing a pet or other animal. A canopy covers the enclosure. The canopy has a fastener for adjustably opening the canopy as desired. The enclosure is designed to be removable from the carriage and collapsible for easy storage and transporting when not in use. Similarly, the carriage can be folded for easy storage and transportation as well.

A THIRD EXAMPLE, U.S. Pat. No. 6,021,740, Issued on Feb. 8, 2000, to Martz teaches a portable animal carrier that permits the transportation of a small animal, such as a cat or dog, in the passenger compartment of an airplane by securely and safely containing the animal, but permitting placement below the airplane seat. In addition to providing manual carrying of the portable animal carrier, wheels permit smooth, quiet, and reliable movement, thereby relieving the user from carrying the weight of the animal carrier.

A FOURTH EXAMPLE, U.S. Pat. No. 6,230,656, Issued on May 15, 2001, to Walach teaches a pet carrier that includes a cage-like enclosure having a top, a bottom, a front end, and an opposite rear end. Two spaced wheels are connected to the cage-like enclosure at the bottom rear end so that when the front end is lifted off of a support surface, the pet carrier can be rolled. A handle is pivotally connected to the cage-like enclosure at the top and near the front end. The handle is selectively lockable in a plurality of angular positions allowing the height of the handle to be adjusted to accommodate users of different heights.

A FIFTH EXAMPLE, U.S. Pat. No. 8,267,048, Issued on Sep. 18, 2012, to Flannery, et al. teaches a pet crate having a top, a bottom, and a cage between the top and the bottom. The cage can be engaged to, and disengaged from, each of the top and the bottom. When engaged to the top and the bottom, or when disengaged from either one or both of the top and the bottom, the cage is endless and can safely hold a pet therein. When disengaged from the top and the bottom, the cage is foldable into a closed, endless, and flat configuration so that the cage can be stored between the top and the bottom so that the cage as a whole in a stored configuration is generally flat. When disengaged from the top and the bottom, the cage is foldable out into a fence configuration by disconnecting two ends of the cage.

A SIXTH EXAMPLE, U.S. Patent Office Document No. Des. 398,083, Issued on Sep. 8, 1998, to Martz teaches the ornamental design for an animal carrier.

A SEVENTH EXAMPLE, U.S. Patent Office Document No. Des. 505,754, Issued on May 31, 2005, to Cohen-Fyffe teaches the ornamental design for a shopping cart seat cover for pets.

AN EIGHTH EXAMPLE, U.S. Patent Office Document No. Des. 662,263, Issued on Jun. 19, 2012, to Chau, et al. teaches the ornamental design for a pet carrier.

A NINTH EXAMPLE, U.S. Patent Office Document No. 2009/0205578, Published on Aug. 20, 2009, to Alves teaches a wheeled pet carrier that also contains a detachable litter box. The pet carrier also optionally has a retractable shoulder strap and a retractable handle. The retractable handle can be used to pull the wheeled pet carrier. The litter box portion also optionally has a deodorizer.

A TENTH EXAMPLE, U.S. Patent Office Document No. 2009/0302564, Published on Dec. 10, 2009, to Evans, et al. teaches a human-powered and multi-functional pet cart for transporting pets or animals. The cart is particularly beneficial for pets with health problems, but may be used with any pet. A riding bed, which is 1 to 12 inches above ground, enables easy entrance and exit for animals with mobility problems. An accessory station with an extension bar permits a variety of pet accessories to be carried over the riding bed. Pet accessories can be carried that address comfort, standard necessities, or special pet needs. The use of a detachable front wheel assembly allows the cart to fit into a small vehicle for remote use. Padded floors and sidewall windows are designed to make the riding more enjoyable for the pet.

It is apparent now that numerous innovations for pet carriers have been provided in the prior art that adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide an all purpose pet cart that avoids the disadvantages of the prior art.

ANOTHER OBJECT of the present invention is to provide an all purpose pet cart that is simple and inexpensive to manufacture.

STILL ANOTHER OBJECT of the present invention is to provide an all purpose pet cart that is simple to use.

BRIEFLY STATED, STILL YET ANOTHER OBJECT of the present invention is to provide a rolling cart/carrier that self-rights a pet contained in the rolling cart/carrier regardless of what terrain is traversed, and is height-adjustable so as to allow comfortable rolling of the rolling cart/carrier by a user. The rolling cart/carrier includes a cart and a carrier. The cart is height-adjustable so as to allow comfortable rolling of the rolling cart/carrier by the user. The carrier is replaceably attached to the cart, and self-rights the pet contained in the carrier regardless of what terrain is traversed by the cart.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows.

A MARSHALING OF REFERENCE NUMERALS UTILIZED IN THE DRAWING 20 rolling cart/carrier of embodiments of present invention for self-righting pet 22 contained in rolling cart/carrier 20 regardless of what terrain 24 is traversed, and for being height-adjustable so as to allow comfortable rolling of rolling cart/carrier 20 by user 26
22 pet
24 terrain
26 user
28 cart for being height-adjustable so as to allow comfortable rolling of rolling cart/carrier 20 by user 26
30 carrier for self-righting pet 22 contained in carrier 30 regardless of what terrain 24 is traversed by cart 28
32 storage container for storing items needed for pet 22
34 frame of cart 28
36 handle of cart 28
38 backbone of frame 34 of cart 38
40 lower end of backbone 38 of frame 34 of cart 38
42 upper end of backbone 38 of frame 34 of cart 38
44 cross member of frame 34 of cart 28
46 pair of ends of cross member 44 of frame 34 of cart 28
48 pair of struts of frame 34 of cart 38
50 lower ends of pair of struts 48 of frame 34 of cart 38, respectively
52 grip of handle 36 of cart 38 for allowing comfortable rolling of rolling cart/carrier 20 by user 26
54 plurality of bores of backbone 38 of frame 34 of cart 38
56 rear face of backbone 38 of frame 34 of cart 38
58 bore of handle 36 of cart 38
60 rear face of handle 36 of cart 38
61 fastener of cart 28
62 shelf of frame 34 of cart 28
63 button of fastener 61 of cart 28
64 rear portion of shelf 62 of frame 34 of cart 28
66 through slot of rear portion 64 of shelf 62 of frame 34 of cart 28
68 thumb screw of shelf 62 of frame 34 of cart 28
70 corners of shelf 62 of frame 34 of cart 28
72 posts of shelf 62 of frame 34 of cart 28
74 first compartment of storage container 32
76 second compartment of storage container 32
78 open front of first compartment 74 of storage container 32
80 front door of first compartment 74 of storage container 32
82 top edge of front door 80 of first compartment 74 of storage container 32
84 cutout of front door 80 of first compartment 74 of storage container 32
86 open front of second compartment 76 of storage container 32
88 open top of second compartment 76 of storage container 32
90 top door of second compartment 76 of storage container 32
92 front half portion of top door 90 of second compartment 76 of storage container 32
94 rear half portion of top door 90 of second compartment 76 of storage container 32
96 fold line of top door 90 of second compartment 76 of storage container 32
98 front edge of front half portion 92 of top door 90 of second compartment 76 of storage container 32
100 cutout of top door 90 of second compartment 76 of storage container 32
102 plurality of fold-out drawers of second compartment 76 of storage container 32
104 plurality of links of second compartment 76 of storage container 32
106 wheels of storage container 32
108 housing of carrier 30
110 compartment of carrier 30

112 front wall of housing 108 of carrier 30
114 top wall of housing 108 of carrier 30
116 rear wall of housing 108 of carrier 30
118 pair of opposing open ends of housing 108 of carrier 30
119 pair of doors of housing 108 of carrier 30
120 floor of compartment 110 of carrier 30
122 rollers of carrier 30
124 matrix of cris-crossed and spaced-apart wires of each door of pair of doors 119 of housing 108 of carrier 30 for allowing pet 22 to see out therethrough and make riding more enjoyable for pet 22
126 pair of fabric drapes of carrier 30
128 drape fasteners of carrier 30
130 hook and loop pile fasteners of drape fasteners 128 of carrier 30
132 snaps of drape fasteners 128 of carrier 30
134 front handle of carrier 30
136 top handle of carrier 30

DETAILED DESCRIPTION OF THE PREFERRED EMBODIMENT

Figure 1:
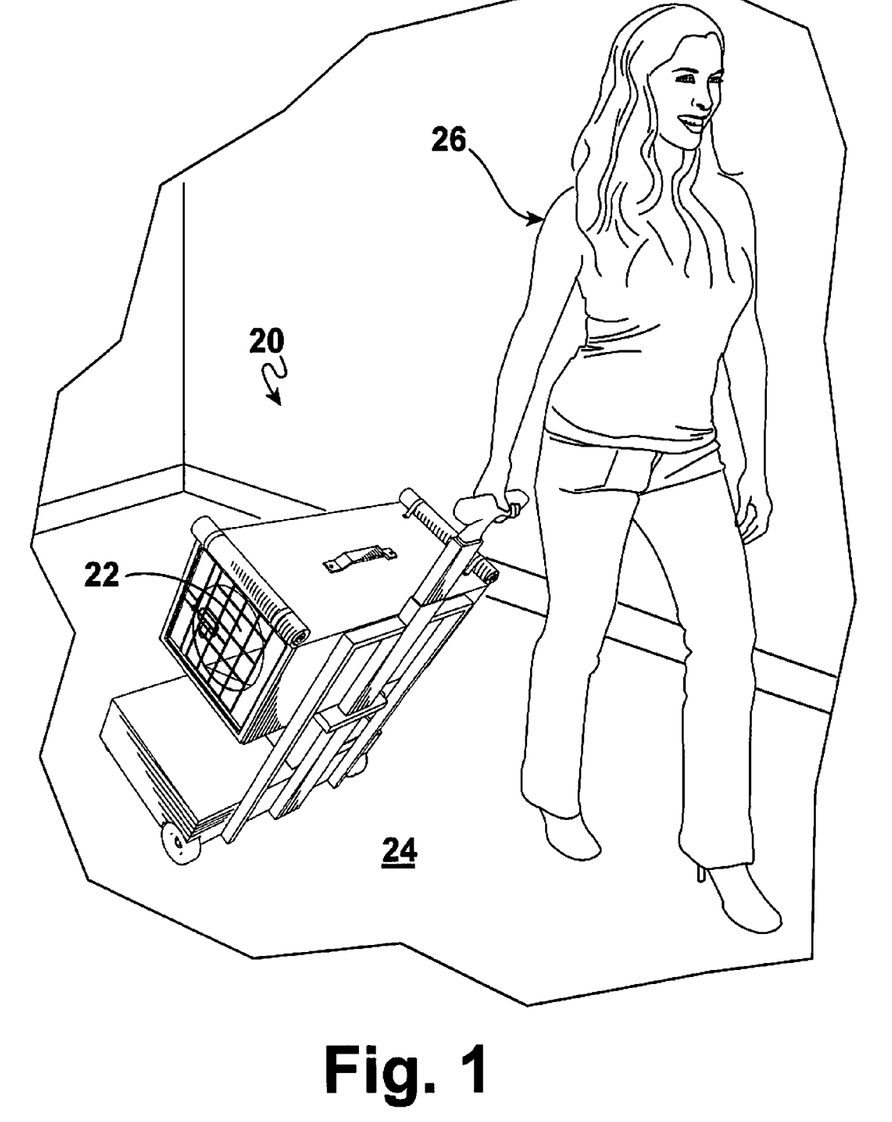
FIG. 1 is a diagrammatic perspective view of an embodiment of the present invention in use.

Referring now to the figures, in which like numerals indicate like parts, and particularly to FIG. 1, the rolling cart/carrier of the embodiments of the present invention is shown generally at 20 for self-righting a pet 22 contained in the rolling cart/carrier 20 regardless of what terrain 24 is traversed, and for being height-adjustable so as to allow comfortable rolling of the rolling cart/carrier 20 by a user 26.

The overall configuration of the rolling cart/carrier 20 can best be seen in FIGS. 2, 3, and 5-9, and as such, will be discussed with reference thereto.

The rolling cart/carrier 20 comprises a cart 28 and a carrier 30. The cart 28 is for being height-adjustable so as to allow comfortable rolling of the rolling cart/carrier 20 by the user 26. The carrier 30 is replaceably attached to the cart 28, and is for self-righting the pet 22 contained in the carrier 30 regardless of what terrain 24 is traversed by the cart 28.

The rolling cart/carrier 20 further comprises a storage container 32.

The storage container 32 is attached to the cart 28, and is for storing items needed for the pet 22.

The specific configuration of the cart 28 can best be seen in FIGS. 2, 3, 5-7, 11, and 12, and as such, will be discussed with reference thereto.

The cart 28 comprises a frame 34 and a handle 36.

The frame 34 of the cart 28 includes a backbone 38.

The backbone 38 of the frame 34 of the cart 28 is vertically oriented, hollow, generally rectangular shaped in top plan view, and as such, can be made from box stock, and has a lower end 40 and an upper end 42.

The frame 34 of the cart 28 further includes a cross member 44.

The cross member 44 of the frame 34 of the cart 28 is horizontally oriented, extends equally from both sides of, and is as thick as, the backbone 38 of the frame 34 of the cart 28, has a pair of ends 46, and is disposed just below the upper end 42 of the backbone 38 of the frame 34 of the cart 28.

The frame 34 of the cart 28 further includes a pair of struts 48.

The pair of struts 48 of the frame 34 of the cart 28 are vertically oriented, parallel to each other, parallel to the backbone 38 of the frame 34 of the cart 28, and depend from the pair of ends 46 of, and are perpendicular to, the cross member 44 of the frame 34 of the cart 28, respectively, to lower ends 50, respectively.

The handle 36 of the cart 28 is snugly expendable from, and snugly retractable into, the upper end 42 of the backbone 38 of the frame 34 of the cart 28 so as to be telescopic, and as such, is height adjustable, has a cross section to fit frictionally in the backbone 38 of the frame 34 of the cart 28, and is vertically oriented.

The handle 36 of the cart 28 has a grip 52. The grip 52 of the handle 36 of the cart 28 is for allowing comfortable rolling of the rolling cart/carrier 20 by the user 26.

The backbone 38 of the frame 34 of the cart 28 further has a plurality of bores 54 and a rear face 56.

The plurality of bores 54 of the backbone 38 of the frame 34 of the cart 28 are vertically aligned with each other, are spaced-apart from each other, extend along the rear face 56 of the backbone 38 of the frame 34 of the cart 28, and start just below the upper end 42 of the backbone 38 of the frame 34 of the cart 28.

The handle 36 of the cart 28 further has a bore 58 and a rear face 60.

The bore 58 of the handle 36 of the cart 28 is disposed in the rear face 60 of the handle 36 of the cart 28, and is alignable with any one of the plurality of bores 54 of the backbone 38 of the frame 34 of the cart 28.

The cart 28 further has a fastener 61.

Figure 12:
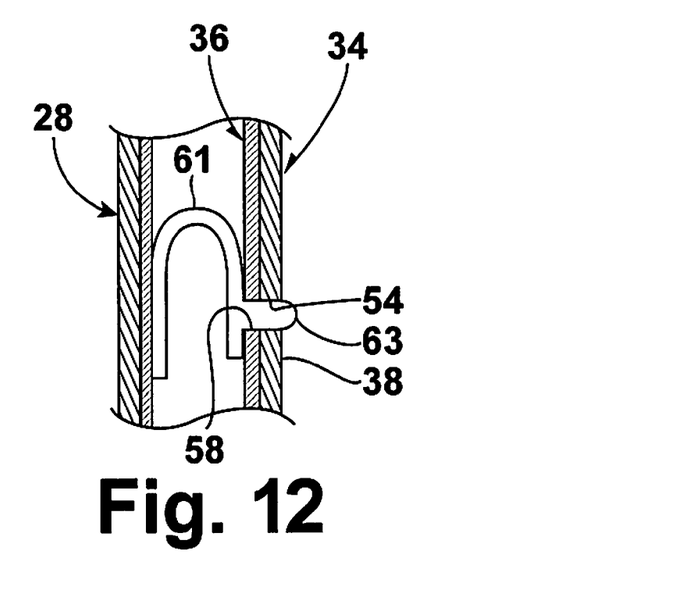
FIG. 12 is a cross sectional view taken on line 12-12 in FIG. 11 showing the height adjustment latch mechanism.

The fastener 61 of the cart 28 is resilient, is inverted U-shaped, is disposed within the handle 36 of the cart 28, and has a button 63.

The button 63 of the fastener 61 of the cart 28 passes through the bore 58 of the handle 36 of the cart 28 and through, and out of, a desired bore of the plurality of bores 54 of the backbone 38 of the frame 34 of the cart 28, to thereby maintain the handle 36 of the cart 28 at a desired height.

Figure 11:
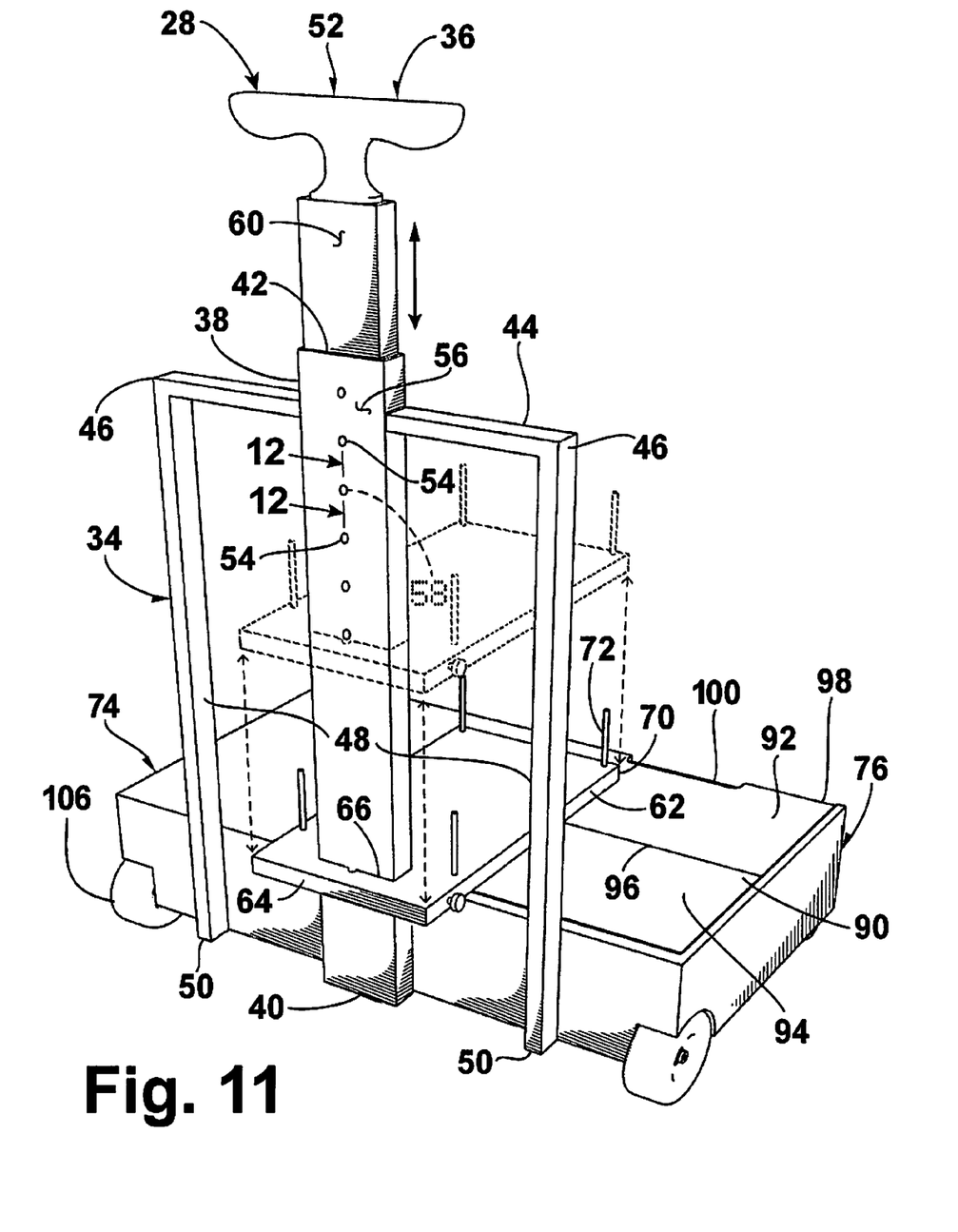
FIG. 11 is a diagrammatic perspective view of the cart per se, showing the pet carrier platform being moved to various height positions.

The frame 34 of the cart 28 further includes a shelf 62.

The shelf 62 of the frame 34 of the cart 28 is horizontally oriented, is rectangular-shaped, is vertically movably attached to the backbone 38 of the frame 34 of the cart 28 so as to be height-adjustable, and has a rear portion 64.

The rear portion 64 of the shelf 62 of the frame 34 of the cart 28 has a through slot 66.

The through slot 66 of the rear portion 64 of the shelf 62 of the frame 34 of the cart 28 is sized and shaped to match that of, so as to fit, the backbone 38 of the frame 34 of the cart 28 therethrough.

The shelf 62 of the frame 34 of the cart 28 further has a thumb screw 68.

The thumb screw 68 of the shelf 62 of the frame 34 of the cart 28 is horizontally oriented, extends laterally into the rear portion 64 of the shelf 62 of the frame 34 of the cart 28, and is communicatable with the through slot 66 of the rear portion 64 of the shelf 62 of the frame 34 of the cart 28 so after the shelf 62 of the frame 34 of the cart 28 is height adjusted to a desired elevation on the backbone 38 of the frame 34 of the cart 28, the thumb screw 68 of the shelf 62 of the frame 34 of the cart 28 is tightened against the backbone 38 of the frame 34 of the cart 28, to thereby maintain the shelf 62 of the frame 34 of the cart 28 at the desired elevation.

The shelf 62 of the frame 34 of the cart 28 further has corners 70 and posts 72.

The posts 72 of the shelf 62 of the frame 34 of the cart 28 extend upwardly from the corners 70 of the shelf 62 of the frame 34 of the cart 28, respectively, and replaceably maintain the carrier 30 in position on the shelf 62 of the frame 34 of the cart 28.

The specific configuration of the storage container 32 can best be seen in FIGS. 2-9 and 11, and as such, will be discussed with reference thereto.

The storage container 32 is attached to, and extends forwardly from, the lower ends 50 of the pair of struts 48 of the frame 34 of the cart 28.

The storage container 32 is divided laterally into a first compartment 74 and a second compartment 76.

The first compartment 74 of the storage container 32 and the second compartment 76 of the storage container 32 are disposed side-by-side, and are substantially equal to each other in general size and shape, namely, generally rectangular-parallelepiped-shapes.

The first compartment 74 of the storage container 32 has an open front 78 and a front door 80.

The front door 80 of the first compartment 74 of the storage container 32 selectively closes the open front 78 of the first compartment 74 of the storage container 32, and has a top edge 82 and a cutout 84.

The cutout 84 of the door 80 of the first compartment 74 of the storage container 32 is disposed on the top edge 82 of the door 80 of the first compartment 74 of the storage container 32, and facilitates opening the front door 80 of the first compartment 74 of the storage container 32 by the user 26.

The second compartment 76 of the storage container 32 has an open front 86, an open top 88, and a top door 90.

The top door 90 of the second compartment 76 of the storage container 32 selectively closes the open top 88 of the second compartment 76 of the storage container 32, and is divided laterally into a front half portion 92 and a rear half portion 94.

The front half portion 92 of the top door 90 of the second compartment 76 of the storage container 32 is pivotally attached to the rear half portion 94 of the top door 90 of the second compartment 76 of the storage container 32, at a fold line 96, so as to allow the front half portion 92 of the top door 90 of the second compartment 76 of the storage container 32 to fold back onto the rear half portion 94 of the top door 90 of the second compartment 76 of the storage container 32 and expose the open top 88 of the second compartment 76 of the storage container 32 in its entirety.

The front half portion 92 of the top door 90 of the second compartment 76 of the storage container 32 has a front edge 98 and a cutout 100.

The cutout 100 of the top door 90 of the second compartment 76 of the storage container 32 is disposed on the front edge 98 of the front half portion 92 of the top door 90 of the second compartment 76 of the storage container 32, and facilitates opening the top door 90 of the second compartment 76 of the storage container 32 by the user 26.

Figure 4:
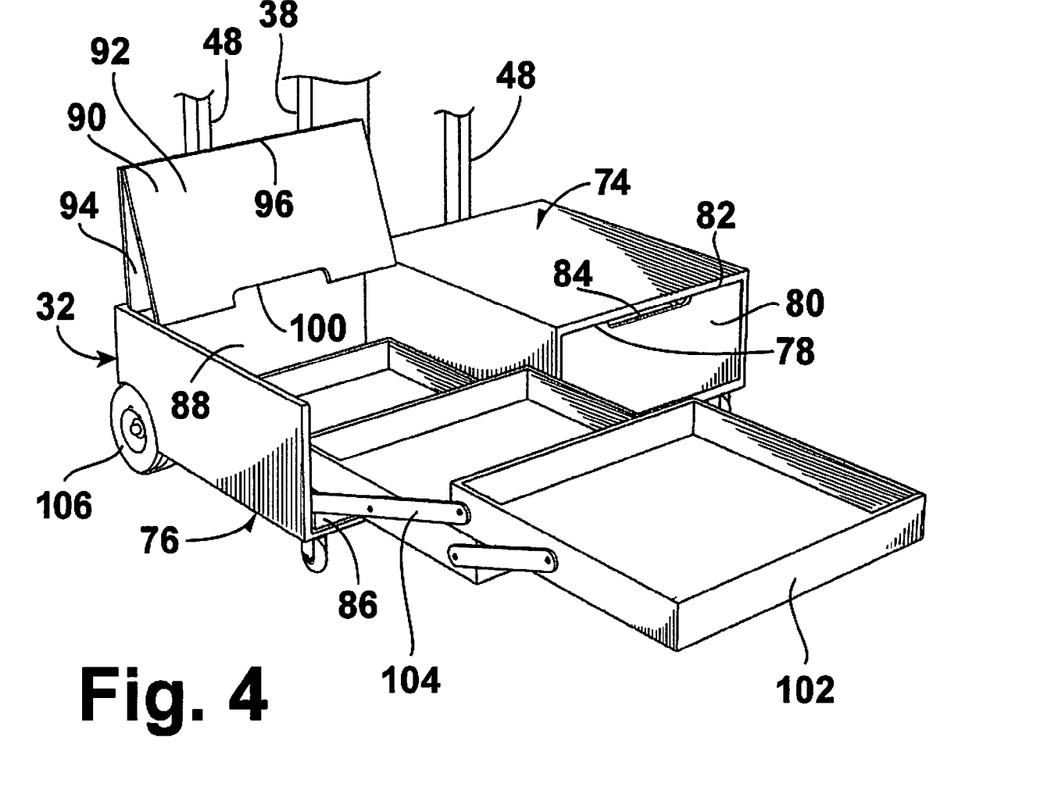
FIG. 4 is a diagrammatic perspective view illustrating, the area enclosed in the dotted circle indicated by arrow 4 in FIG. 2, a set of multi compartment storage containers in an open position.

The second compartment 76 of the storage container 32 further has a plurality of fold-out drawers 102 and a plurality of links 104.

The plurality of fold-out drawers 102 of the second compartment 76 of the storage container 32 are operatively connected to each other by the plurality of links 104 of the second compartment 76 of the storage container 32 so as to allow the plurality of fold-out drawers 102 of the second compartment 76 of the storage container 32 to selectively pivot forwardly through the open front 86 of the second compartment 76 of the storage container 32, at different elevations, so as to allow the plurality of fold-out drawers 102 of the second compartment 76 of the storage container 32 to be accessible simultaneously.

The storage container 32 further has wheels 106.

The wheels 106 of the storage container 32 rotatably depend therefrom so as to allow the rolling cart/carrier 20 to roll comfortably by the user 26.

The specific configuration of the carrier 30 can best be seen in FIGS. 2, 3, 5-10, and 13-15, and as such, will be discussed with reference thereto.

The carrier 30 includes a housing 108 and a compartment 110.

Figure 10:
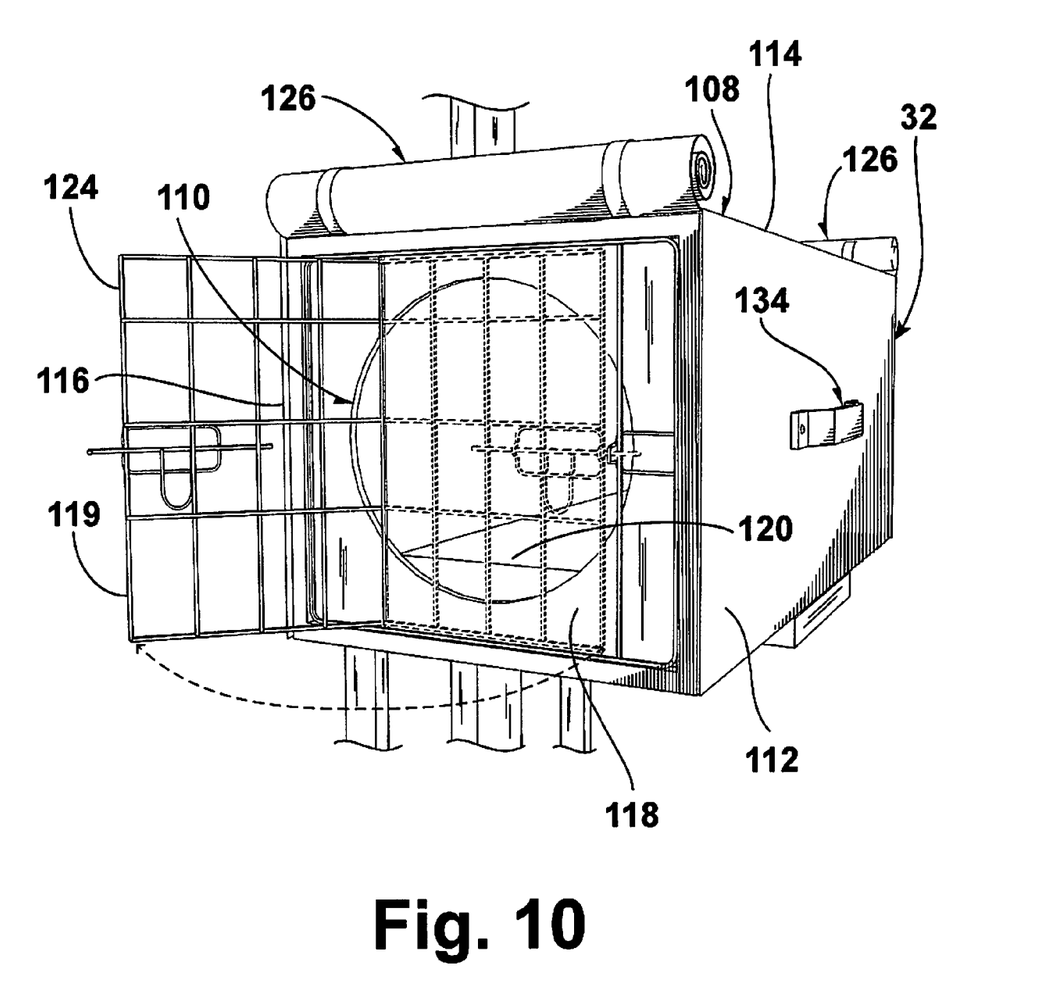
FIG. 10 is an enlarged diagrammatic perspective view showing the pet carrier, with a door open and parts broken away.
Figure 13:
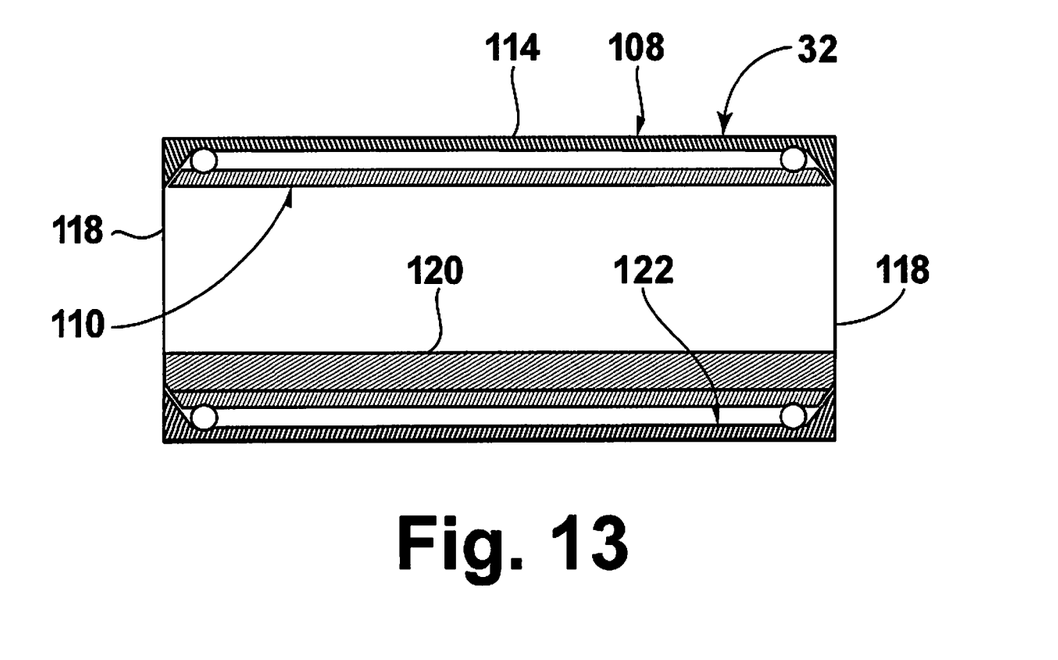
FIG. 13 is across sectional view, with some parts omitted for clarity, taken on line 13-13 in FIG. 7 showing the bearing mounted revolving pet compartment.

The compartment 110 of the carrier 30 is rotatably contained within the housing 108 of the carrier 30, and is for containing the pet 22.

The housing 108 of the carrier 30 is hollow, replaceably sits on the shelf 62 of the frame 34 of the cart 28, and is rectangular-parallelepiped-shaped, and as such, has a front wall 112, a top wall 114, a rear wall 116, and a pair of opposing open ends 118.

The housing 108 of the carrier 30 further has a pair of doors 119.

The pair of doors 119 of the housing 108 of the carrier 30 selectively close the pair of opposing open ends 118 of the housing 108 of the carrier 30, respectively.

The compartment 110 of the carrier 30 is hollow, cylindrically shaped, and has a floor 120.

The carrier 30 further includes rollers 122.

The rollers 122 of the carrier 30 extend between, and are operatively connected to, the housing 108 of the carrier 30 and the compartment 110 of the carrier 30 so as to allow the compartment 110 of the carrier 30 to rotate within the housing 108 of the carrier 30.

The floor 120 of the compartment 110 of the carrier 30 is weighted so as to allow the floor 120 of the compartment 110 of the carrier 30 to always be horizontal regardless of what orientation the housing 108 of the carrier 30 is in, to thereby self-right the pet 22 resting on the floor 120 of the compartment 110 of the carrier 30.

Each door 119 of the housing 108 of the carrier 30 is a matrix of cris-crossed and spaced-apart wires 124. The matrix of cris-crossed and spaced-apart wires 124 of each door 119 of the housing 108 of the carrier 30 is for allowing the pet 22 to see out therethrough and make the riding more enjoyable for the pet 22.

Figure 5:
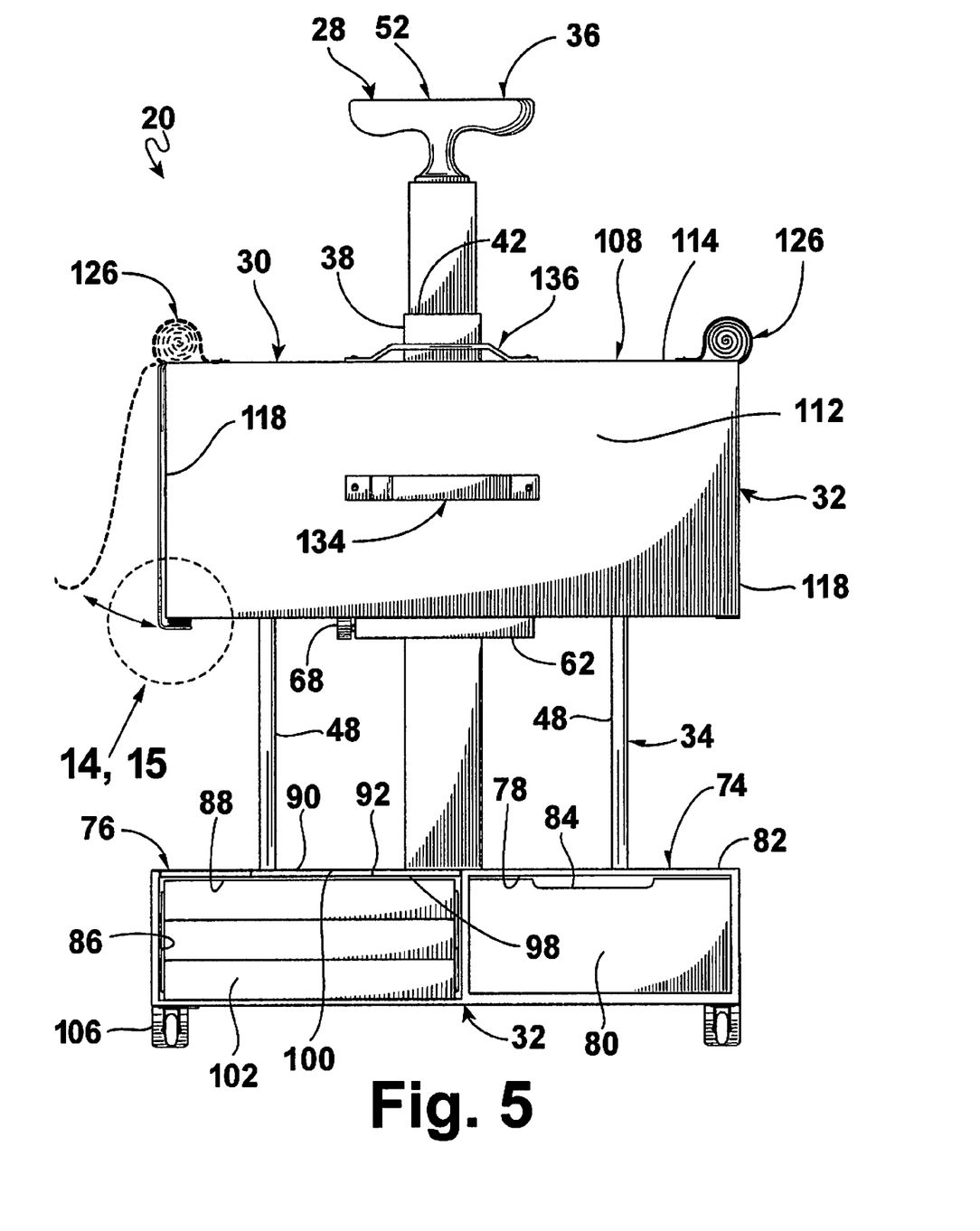
FIG. 5 is a front elevational view thereof, taken in the direction of arrow 5 in FIG. 2 showing one end of the pet carrier being covered with a fabric cover.
Figure 6:
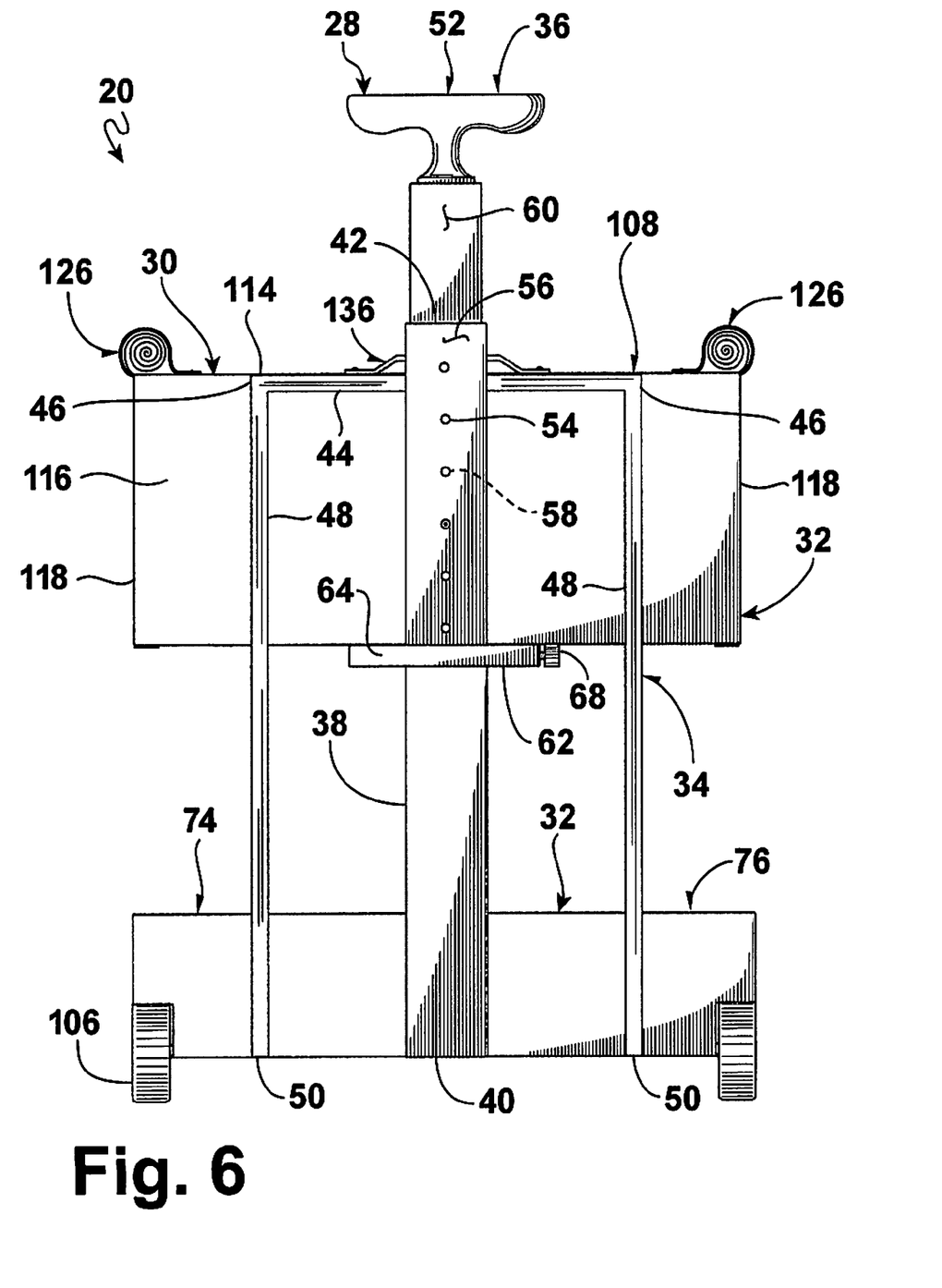
FIG. 6 is a rear elevational view thereof, taken in the direction of arrow 6 in FIG. 2.
Figure 7:
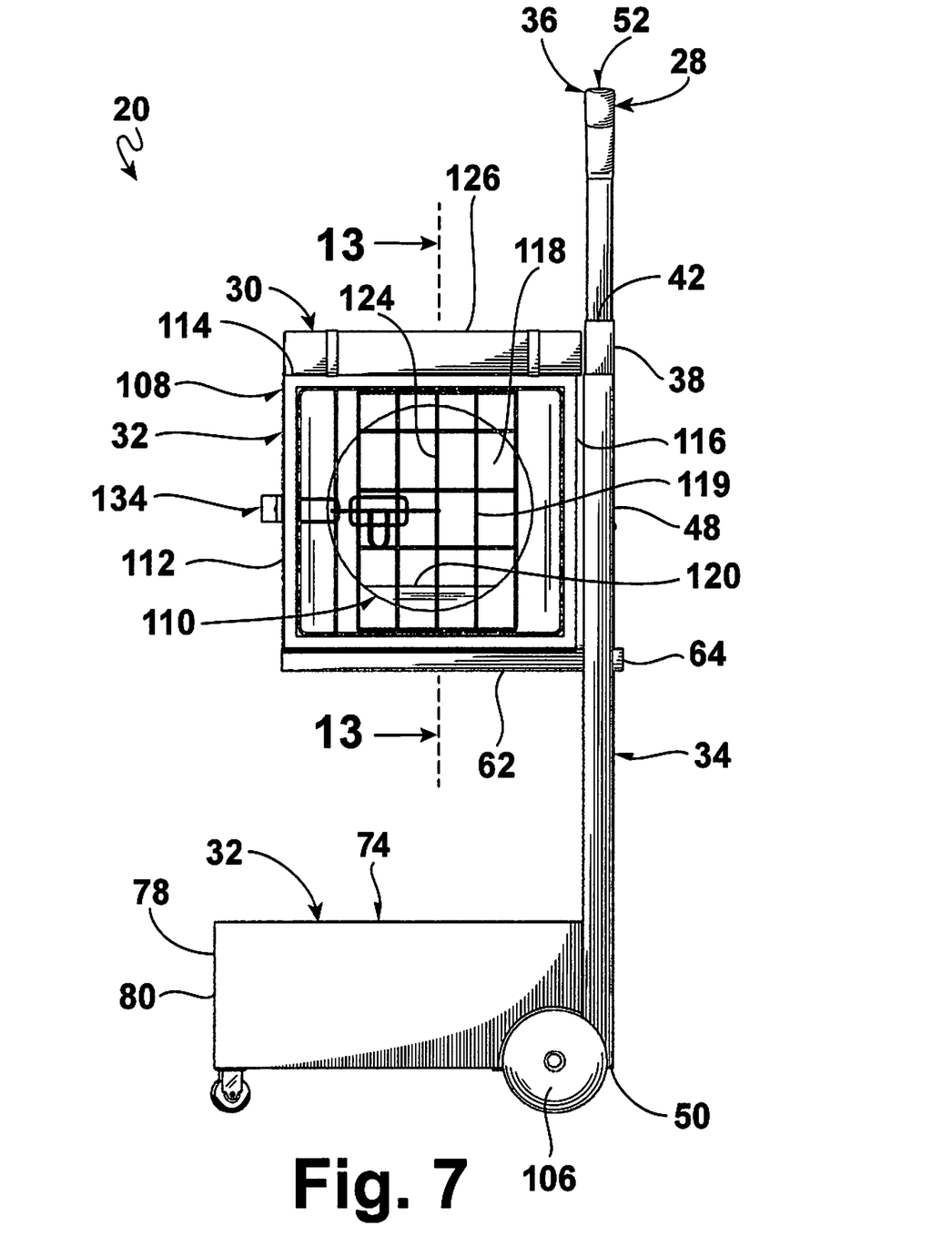
FIG. 7 is a left side elevational view thereof, taken in the direction of arrow 7 in FIG. 2, the right side elevational view being a mirror image thereof.
Figure 8:
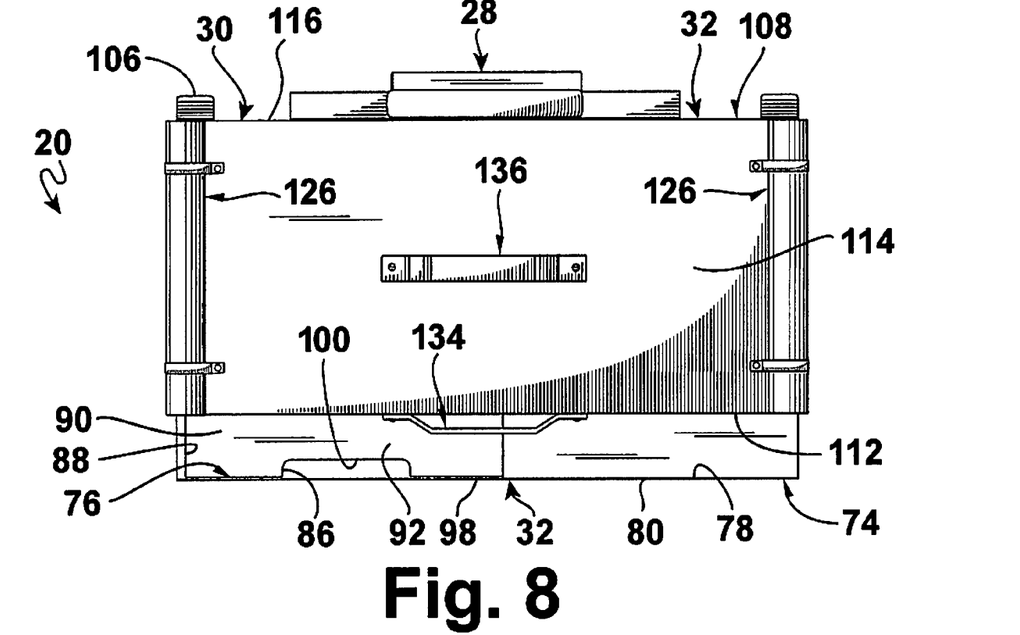
FIG. 8 is a top plan view thereof, taken in the direction of arrow 8 in FIG. 2.
Figure 9:
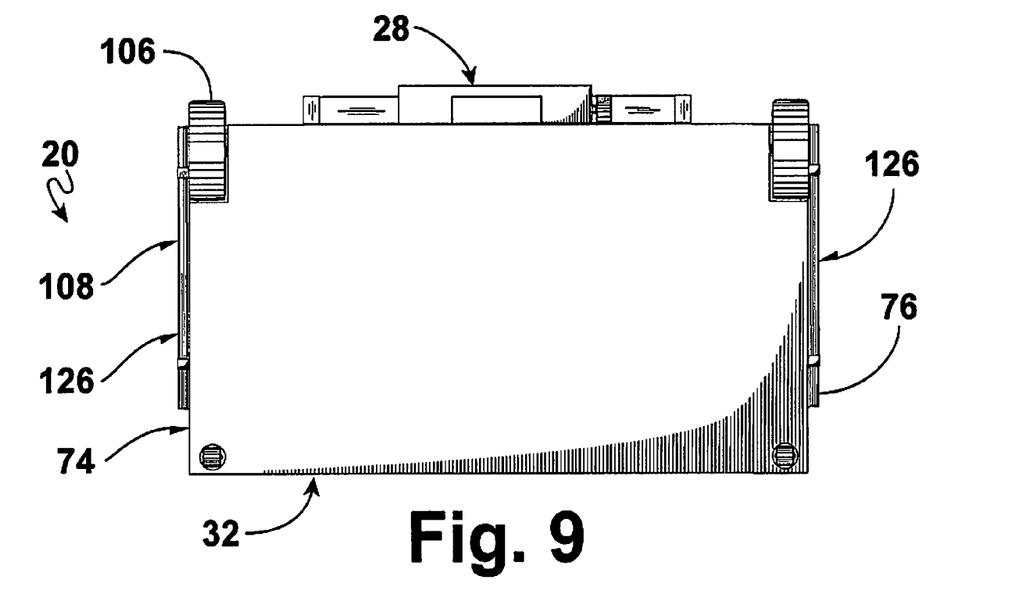
FIG. 9 is a bottom plan view thereof, taken in the direction of arrow 9 in FIG. 2.

The carrier 30 further includes a pair of fabric drapes 126.

The pair of fabric drapes 126 of the carrier 30 are rollingly stored on the top wall 114 of the housing 108 of the carrier 30, adjacent the pair of doors 119 of the housing 108 of the carrier 30, respectively, and unroll therefrom when called upon to cover the pair of doors 119 of the housing 108 of the carrier 30, respectively.

Figure 14:
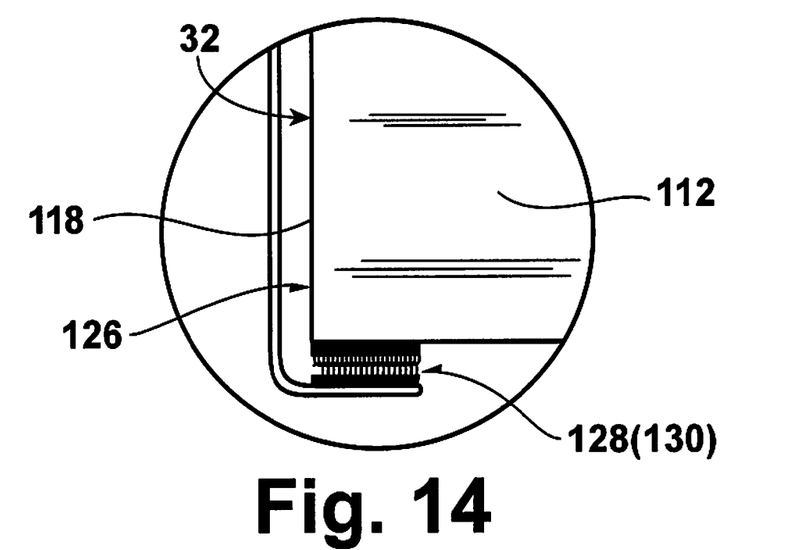
FIG. 14 is a diagrammatic view, taken in the enclosed dotted circle indicated by arrow 14 in FIG. 5 illustrating a cover component being held closed by hook and loop pile fastener means.
Figure 15:
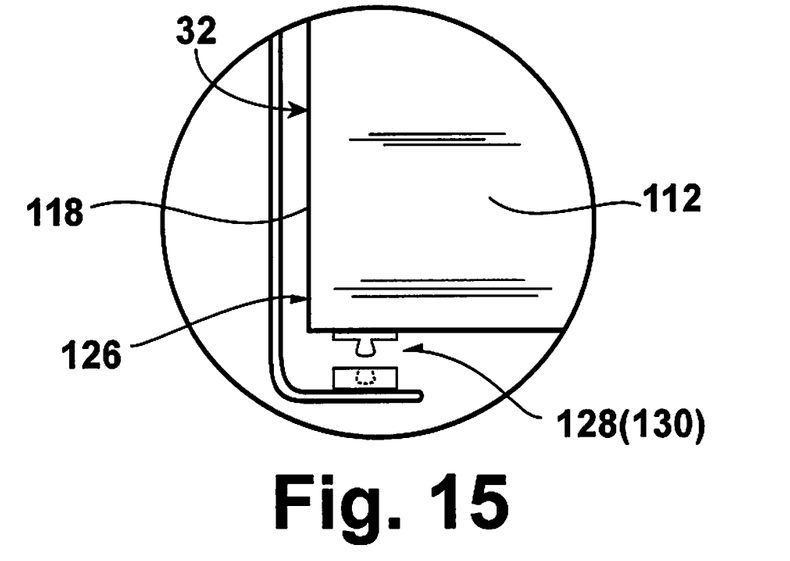
FIG. 15 is a diagrammatic view, taken in the enclosed dotted circle indicated by arrow 15 in FIG. 5 illustrating a cover component being held closed by snap fastener means.

The carrier 30 further includes drape fasteners 128.

The drape fasteners 128 of the carrier 30 maintain the pair of fabric drapes 126 of the carrier 30 closed over the pair of doors 119 of the housing 108 of the carrier 30, respectively, and as shown in FIG. 14 is hook and loop pile fasteners 130, and as shown in FIG. 15 is snaps 132.

Figure 2:
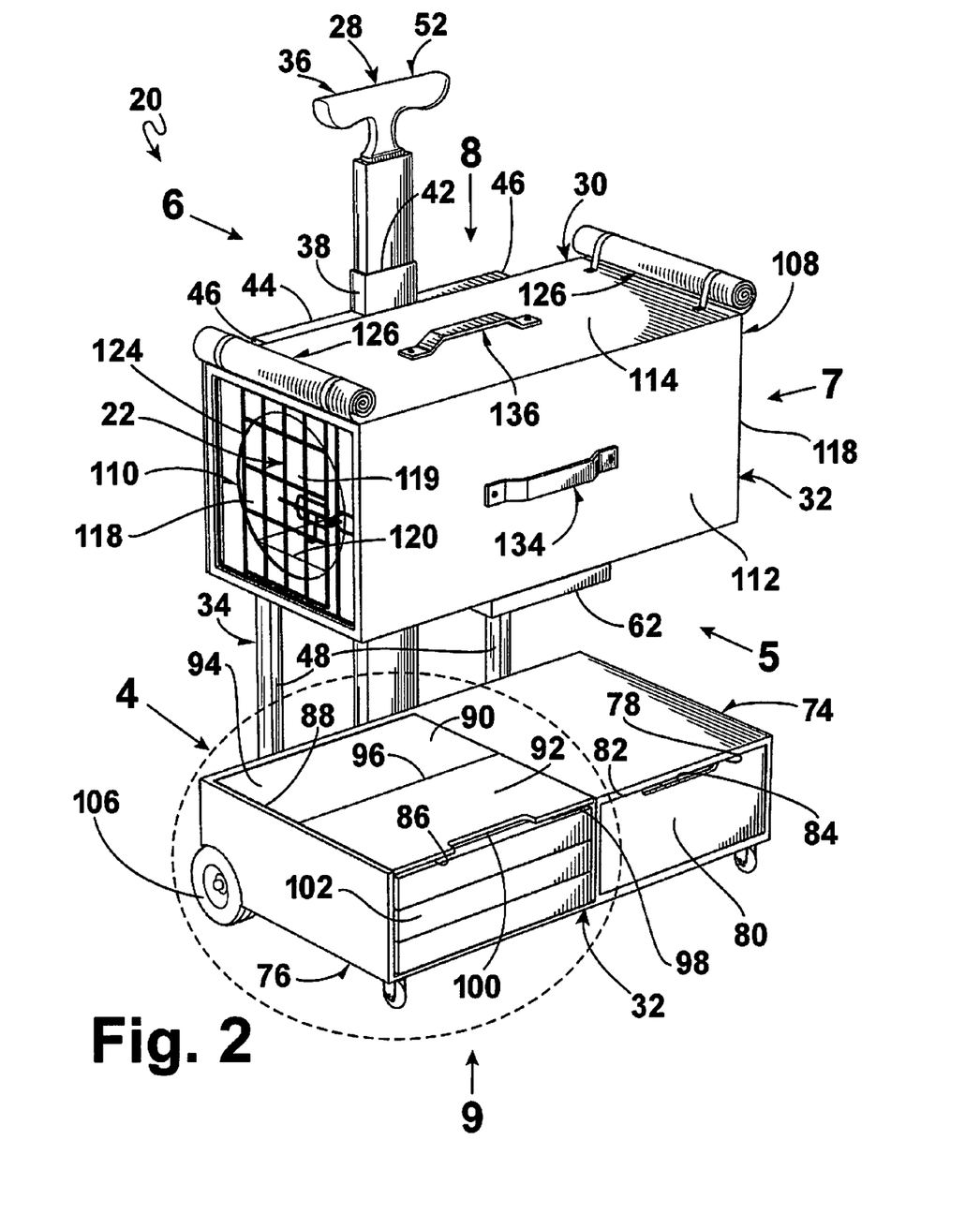
FIG. 2 is a diagrammatic perspective view thereof per se.
Figure 3:
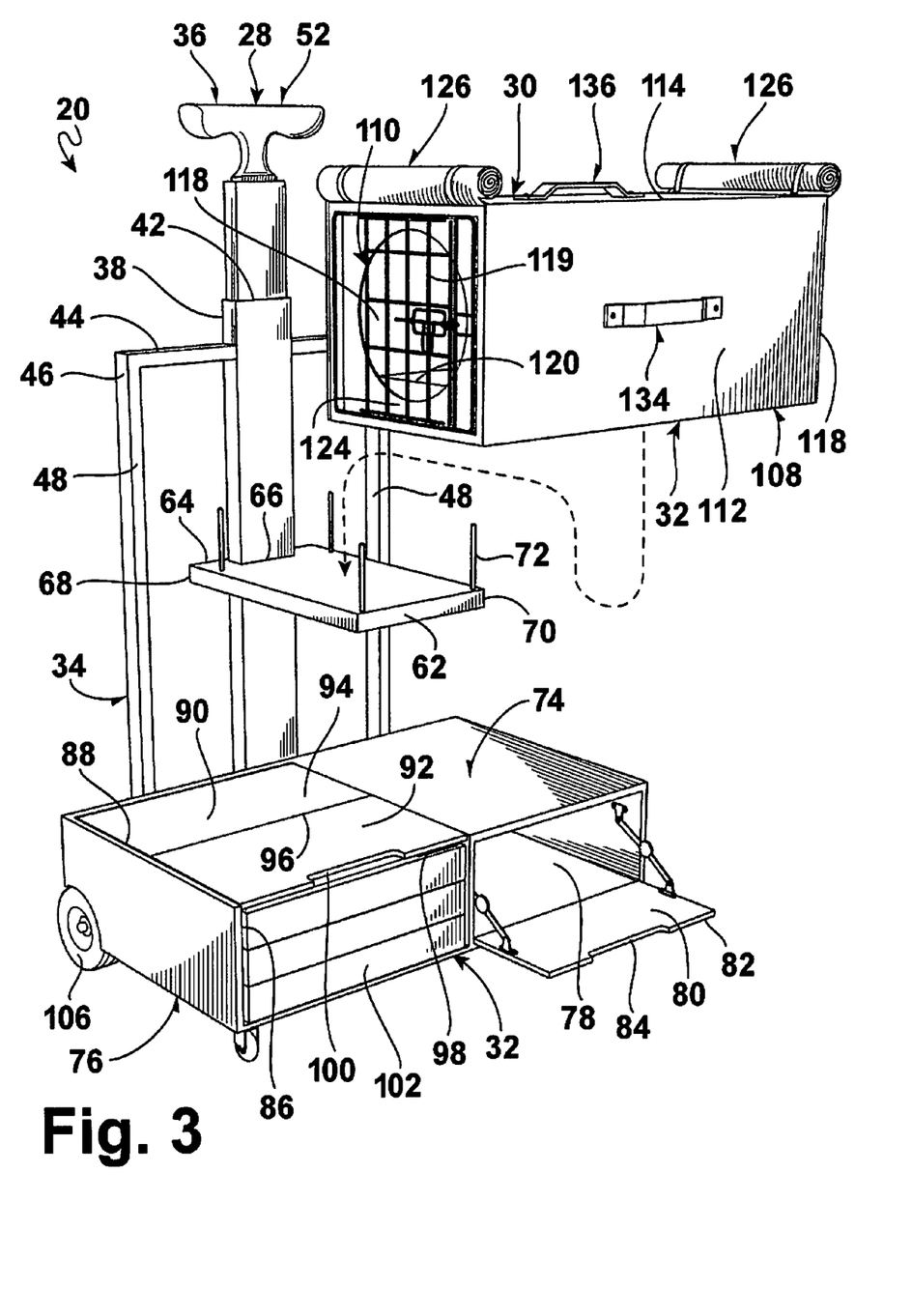
FIG. 3 is a diagrammatic perspective view illustrating the cart with a storage compartment open and the pet carrier separated from the rest of the cart.

The carrier 30 further includes a front handle 134.

The front handle 134 of the carrier 30 is disposed on the front wall 112 of the housing 108 of the carrier 30.

The carrier 30 further includes a top handle 136.

The top handle 136 of the carrier 30 is disposed on the top wall 114 of the housing 108 of the carrier 30.

It will be understood that each of the elements described above, or two or more together, may also find a useful application in other types of constructions differing from the types described above.

While the invention has been illustrated and described as embodiments of an all purpose pet cart, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A rolling carrier for self-righting a pet contained in said rolling carrier regardless of what terrain is traversed, and for being height-adjustable so as to allow comfortable rolling of said rolling carrier by a user, said rolling carrier comprising:
    a) a cart;
    b) a carrier; and
    c) a storage container;
    wherein said cart is for being height-adjustable so as to allow comfortable rolling of said rolling carrier by the user;
    wherein said carrier is replaceably attached to said cart;
    wherein said carrier is for self-righting the pet contained in said carrier regardless of what terrain is traversed by said cart;
    wherein said storage container is attached to said cart;
    wherein said storage container is for storing items needed for the pet;
    wherein said cart comprises a frame;
    wherein said cart comprises a handle;
    wherein said frame of said cart includes backbone;
    wherein said backbone of said frame of said cart is vertically oriented;
    wherein said backbone of said frame of said cart is hollow;
    wherein said backbone of said frame of said cart is generally rectangular shaped in top plan view;
    wherein said backbone of said frame of said cart has a lower end;
    wherein said backbone of said frame of said cart has an upper end;
    wherein said frame of said cart includes a cross member;
    wherein said cross member of said frame of said cart is horizontally oriented;
    wherein said cross member of said frame of said cart extends equally from both sides of said backbone of said frame of said cart;
    wherein said cross member of said frame of said cart is as thick as said backbone of said frame of said cart;
    wherein said cross member of said frame of said cart has a pair of ends;
    wherein said cross member of said frame of said cart is disposed just below said upper end of said backbone of said frame of said cart;
    wherein said carrier includes a housing;
    wherein said carrier includes a compartment;
    wherein said compartment of said carrier is rotatably contained within said housing of said carrier;
    wherein said compartment of said carrier is for containing the pet;
    wherein said housing of said carrier has a pair of opposing open ends;
    wherein said compartment of said carrier is cylindrically shaped;
    wherein said compartment of said carrier has a floor;
    wherein said floor of said compartment of said carrier is weighted so as to allow said floor of said compartment of said carrier to always be horizontal regardless of what orientation said housing of said carrier is in, to thereby self-right the pet resting on said floor of said compartment of said carrier;
    wherein said carrier includes rollers;
    wherein said rollers of said carrier extend between said housing of said carrier and said compartment of said carrier;
    wherein said rollers of said carrier are rotatively connected to said housing of said carrier and rotatively connected to said compartment of said carrier so as to allow said compartment of said carrier to rotate within said housing of said carrier;
    wherein said compartment has a longitudinal axis and a lateral axis;
    wherein said compartment rotates about said longitudinal axis of said compartment that is much longer than said lateral axis of said compartment;
    wherein said rollers are disposed outside said compartment and inside said housing; and
    wherein said rollers extend axially along from end to end of said housing.

2. The rolling carrier of claim 1, wherein said frame of said cart includes a pair of struts.

3. The rolling carrier of claim 2, wherein said pair of struts of said frame of said cart are vertically oriented.

4. The rolling carrier of claim 3, wherein said pair of struts of said frame of said cart are parallel to each other.

5. The rolling carrier of claim 4, wherein said pair of struts of said frame of said cart are parallel to said backbone of said frame of said cart.

6. The rolling carrier of claim 5, wherein said pair of struts of said frame of said cart depend from said pair of ends of said cross member of said frame of said cart, respectively, to lower ends, respectively.

7. The rolling carrier of claim 6, wherein said pair of struts of said frame of said cart are perpendicular to said cross member of said frame of said cart.

8. The rolling carrier of claim 7, wherein said handle of said cart is snugly expendable from, and snugly retractable into, said upper end of said backbone of said frame of said cart so as to be telescopic.

9. The rolling carrier of claim 8, wherein said handle of said cart is vertically oriented.

10. The rolling carrier of claim 9, wherein said handle of said cart is height adjustable.

11. The rolling carrier of claim 10, wherein said handle of said cart has a cross section to fit frictionally in said backbone of said frame of said cart.

12. The rolling carrier of claim 11, wherein said handle of said cart has a grip; and
    wherein said grip of said handle of said cart is for allowing comfortable rolling of said rolling carrier by the user.

13. The rolling carrier of claim 12, wherein said backbone of said frame of said cart has a plurality of bores.

14. The rolling carrier of claim 13, wherein said backbone of said frame of said cart has a rear face.

15. The rolling carrier of claim 14, wherein said plurality of bores of said backbone of said frame of said cart are vertically aligned with each other.

16. The rolling carrier of claim 15, wherein said plurality of bores of said backbone of said frame of said cart are spaced-apart from each other.

17. The rolling carrier of claim 16, wherein said plurality of bores of said backbone of said frame of said cart extend along said rear face of said backbone of said frame of said cart.

18. The rolling carrier of claim 17, wherein said plurality of bores of said backbone of said frame of said cart start just below said upper end of said backbone of said frame of said cart.

19. The rolling carrier of claim 18, wherein said handle of said cart has a bore.

20. The rolling carrier of claim 19, wherein said handle of said cart has a rear face.

21. The rolling carrier of claim 20, wherein said bore of said handle of said cart is disposed in said rear face of said handle of said cart.

22. The rolling carrier of claim 21, wherein said bore of said handle of said cart is alignable with any one of said plurality of bores of said backbone of said frame of said cart.

23. The rolling carrier of claim 22, wherein said cart has a fastener.

24. The rolling carrier of claim 23, wherein said fastener of said cart is resilient.

25. The rolling carrier of claim 24, wherein said fastener of said cart is inverted U-shaped.

26. The rolling carrier of claim 25, wherein said fastener of said cart is disposed within said handle of said cart.

27. The rolling carrier of claim 26, wherein said fastener of said cart has a button.

28. The rolling carrier of claim 27, wherein said button of said fastener of said cart passes through said bore of said handle of said cart and through, and out of, a desired bore of said plurality of bores of said backbone of said frame of said cart to thereby maintain said handle of said cart at a desired height.

29. The rolling carrier of claim 28, wherein said frame of said cart includes a shelf.

30. The rolling carrier of claim 29, wherein said shelf of said frame of said cart is horizontally oriented.

31. The rolling carrier of claim 30, wherein said shelf of said frame of said cart is movably attached to said backbone of said frame of said cart so as to be height-adjustable.

32. The rolling carrier of claim 31, wherein said shelf of said frame of said cart has a rear portion.

33. The rolling carrier of claim 32, wherein said rear portion of said shelf of said frame of said cart has a through slot.

34. The rolling carrier of claim 33, wherein said through slot of said rear portion of said shelf of said frame of said cart is sized and shaped to match that of, so as to fit, said backbone of said frame of said cart therethrough.

35. The rolling carrier of claim 34, wherein said shelf of said frame of said cart has a thumb screw.

36. The rolling carrier of claim 35, wherein said thumb screw of said shelf of said frame of said cart is horizontally oriented.

37. The rolling carrier of claim 36, wherein said thumb screw of said shelf of said frame of said cart extends laterally into said rear portion of said shelf of said frame of said cart.

38. The rolling carrier of claim 37, wherein said thumb screw of said shelf of said frame of said cart is communicatable with said through slot of said rear portion of said shelf of said frame of said cart so after said shelf of said frame of said cart is height adjusted to a desired elevation on said backbone of said frame of said cart, said thumb screw of said shelf of said frame of said cart is tightened against said backbone of said frame of said cart, to thereby maintain said shelf of said frame of said cart at the desired elevation.

39. The rolling carrier of claim 38, wherein said shelf of said frame of said cart has corners.

40. The rolling carrier of claim 39, wherein said shelf of said frame of said cart has posts.

41. The rolling carrier of claim 40, wherein said posts of said shelf of said frame of said cart extend upwardly from said corners of said shelf of said frame of said cart, respectively.

42. The rolling carrier of claim 41, wherein said storage container is attached to said lower ends of said pair of struts of said frame of said cart.

43. The rolling carrier of claim 42, wherein said storage container extends forwardly from said lower ends of said pair of struts of said frame of said cart.

44. The rolling carrier of claim 43, wherein said storage container is divided laterally into a first compartment.

45. The rolling carrier of claim 44, wherein said storage container is divided laterally into a second compartment.

46. The rolling carrier of claim 45, wherein said first compartment of said storage container and said second compartment of said storage container are disposed side-by-side to each other.

47. The rolling carrier of claim 46, wherein said first compartment of said storage container and said second compartment of said storage container are substantially equal to each other in general size and shape.

48. The rolling carrier of claim 47, wherein said first compartment of said storage container and said second compartment of said storage container are generally rectangular-parallelepiped-shaped.

49. The rolling carrier of claim 48, wherein said first compartment of said storage container has an open front.

50. The rolling carrier of claim 49, wherein said first compartment of said storage container has a front door.

51. The rolling carrier of claim 50, wherein said front door of said first compartment of said storage container selectively closes said open front of said first compartment of said storage container.

52. The rolling carrier of claim 51, wherein said front door of said first compartment of said storage container as a top edge.

53. The rolling carrier of claim 52, wherein said front door of said first compartment of said storage container has a cutout.

54. The rolling carrier of claim 53, wherein said cutout of said front door of said first compartment of said storage container is disposed on said top edge of said front door of said first compartment of said storage container; and
wherein said cutout of said front door of said first compartment of said storage container facilitates opening said front door of said first compartment of said storage container by the user.

55. The rolling carrier of claim 54, wherein said second compartment of said storage container has an open front.

56. The rolling carrier of claim 55, wherein said second compartment of said storage container has an open top.

57. The rolling carrier of claim 56, wherein said second compartment of said storage container has a top door.

58. The rolling carrier of claim 57, wherein said top door of said second compartment of said storage container selectively closes said open top of said second compartment of said storage container.

59. The rolling carrier of claim 58, wherein said top door of said second compartment of said storage container is divided laterally into:
a) a front half door portion; and
b) a rear half portion.

60. The rolling carrier of claim 59, wherein said front half portion of said top door of said second compartment of said storage container is pivotally attached to said rear half portion of said top door of said second compartment of said storage container at a fold line so as to allow said front half portion of said top door of said second compartment of said storage container to fold back onto said rear half portion of said top door of said second compartment of said storage container at a fold line and expose said open top of said second compartment of said storage container in its entirety.

61. The rolling carrier of claim 60, wherein said front half portion of said top door of said second compartment of said storage container has a front edge.

62. The rolling carrier of claim 61, wherein said front half portion of said top door of said second compartment of said storage container has a cutout.

63. The rolling carrier of claim 62, wherein said cutout of said top door of said second compartment of said storage container is disposed on said front edge of said front half portion of said top door of said second compartment of said storage container; and
wherein said cutout of said top door of said second compartment of said storage container facilitates opening said top door of said second compartment of said storage container by the user.

64. The rolling carrier of claim 63, wherein said second compartment of said storage container has a plurality of fold-out drawers.

65. The rolling carrier of claim 64, wherein said second compartment of said storage container has a plurality of links.

66. The rolling carrier of claim 65, wherein said plurality of fold-out drawers of said second compartment of said storage container are operatively connected to each other by said plurality of links of said second compartment of said storage container so as to allow said plurality of fold-out drawers of said second compartment of said storage container to selectively pivot forwardly through said open front of said second compartment of said storage container, at different elevations, so as to allow said plurality of fold-out drawers of said second compartment of said storage container to be accessible simultaneously.

67. The rolling carrier of claim 66, wherein said storage container has wheels.

68. The rolling carrier of claim 67, wherein said wheels of said storage container rotatably depend therefrom so as to allow said rolling carrier to roll comfortably by the user.

69. The rolling carrier of claim 68, wherein said housing of said carrier is hollow.

70. The rolling carrier of claim 69, wherein said housing of said carrier replaceably sits on said shelf of said frame of said cart.

71. The rolling carrier of claim 70, wherein said housing of said carrier is rectangular-parallelepiped-shaped.

72. The rolling carrier of claim 71, wherein said housing of said carrier has a front wall.

73. The rolling carrier of claim 72, wherein said housing of said carrier has a top wall.

74. The rolling carrier of claim 73, wherein said housing of said carrier has a rear wall.

75. The rolling carrier of claim 74, wherein said housing of said carrier has a pair of doors.

76. The rolling carrier of claim 75, wherein said pair of doors of said housing of said carrier selectively close said pair of opposing open ends of said housing of said carrier, respectively.

77. The rolling carrier of claim 76, wherein said compartment of said carrier is hollow.

78. The rolling carrier of claim 77 wherein each door of said housing of said carrier is a matrix of cris-crossed and spaced-apart wires; and
wherein said matrix of cris-crossed and spaced-apart wires of each door of said housing of said carrier is for allowing the pet to see out therethrough and make riding more enjoyable for the pet.

79. The rolling carrier of claim 78, wherein said carrier includes a pair of fabric drapes.

80. The rolling carrier of claim 79, wherein said pair of fabric drapes of said carrier are rollingly stored on said top wall of said housing of said carrier, adjacent said pair of doors of said housing of said carrier, respectively, and unroll therefrom when called upon to cover said pair of doors of said housing of said carrier, respectively.

81. The rolling carrier of claim 80, wherein said carrier includes fastener means.

82. The rolling carrier of claim 81, wherein said fastener means of said carrier maintain said pair of fabric drapes of said carrier closed over said pair of doors of said housing of said carrier, respectively.

83. The rolling carrier of claim 82, wherein said fastener means of said carrier include hook and loop pile fasteners.

84. The rolling carrier of claim 83, wherein said fastener means of said carrier include snaps.

85. The rolling carrier of claim 84, wherein said carrier includes a front handle.

86. The rolling carrier of claim 85, wherein said front handle of said carrier is disposed on said front wall of said housing of said carrier.

87. The rolling carrier of claim 86, wherein said carrier includes a top handle.

88. The rolling carrier of claim 87, wherein said top handle of said carrier is disposed on said top wall of said housing of said carrier.

* * * * *